US011894599B2

(12) United States Patent
Jumani et al.

(10) Patent No.: US 11,894,599 B2
(45) Date of Patent: Feb. 6, 2024

(54) INTEGRATED MICROPHONE AND ANTENNA APPARATUS AND METHOD OF OPERATION

(71) Applicant: Knowles Electronics, LLC, Itasca, IL (US)

(72) Inventors: Karan Jumani, Schaumburg, IL (US); Donald Yochem, Buffalo Grove, IL (US)

(73) Assignee: Knowles Electronics, LLC, Itasca, IL (US)

( * ) Notice: Subject to any disclaimer, the term of this patent is extended or adjusted under 35 U.S.C. 154(b) by 629 days.

(21) Appl. No.: 17/108,713

(22) Filed: Dec. 1, 2020

(65) Prior Publication Data

US 2021/0083359 A1 Mar. 18, 2021

Related U.S. Application Data

(63) Continuation of application No. PCT/US2019/035261, filed on Jun. 3, 2019.

(Continued)

(51) Int. Cl.
*H01Q 1/22* (2006.01)
*H01Q 1/38* (2006.01)
(Continued)

(52) U.S. Cl.
CPC ................. *H01Q 1/22* (2013.01); *H01Q 1/38* (2013.01); *H04R 1/021* (2013.01); *H04R 1/028* (2013.01);

(Continued)

(58) Field of Classification Search
CPC . H01Q 1/22; H01Q 1/38; H04R 1/021; H04R 1/028; H04R 3/00; H04R 19/04; H04R 2201/003

(Continued)

(56) References Cited

U.S. PATENT DOCUMENTS

2007/0121979 A1 5/2007 Zhu
2009/0115668 A1 * 5/2009 Abe ......................... H01Q 1/36 343/702

(Continued)

FOREIGN PATENT DOCUMENTS

EP 2293379 3/2011
EP 3103511 12/2016

(Continued)

OTHER PUBLICATIONS

De Haan, Aldert, International Search Report, International Application No. PCT/US2019/035261, European Patent Office, Rijswijk, NL, dated Aug. 13, 2019.

*Primary Examiner* — Sean H Nguyen

(74) *Attorney, Agent, or Firm* — Loppnow & Chapa; Matthew C. Loppnow

(57) ABSTRACT

Integrated microphone and antennas include a microphone and an antenna. The microphone includes a housing and an acoustic transducer. The housing defines a cavity and includes a conductive layer. The acoustic transducer is positioned within the cavity and structured to generate an acoustic signal. The antenna is at least partially integrated with the microphone and structured to transmit and receive radio frequency signals. The antenna is structured to utilize the conductive layer of the housing as a radiating element.

20 Claims, 10 Drawing Sheets

Related U.S. Application Data

(60) Provisional application No. 62/680,546, filed on Jun. 4, 2018.

(51) Int. Cl.
*H04R 1/02* (2006.01)
*H04R 3/00* (2006.01)
*H04R 19/04* (2006.01)

(52) U.S. Cl.
CPC ............... *H04R 3/00* (2013.01); *H04R 19/04* (2013.01); *H04R 2201/003* (2013.01)

(58) Field of Classification Search
USPC ............................................................ 381/91
See application file for complete search history.

(56) References Cited

U.S. PATENT DOCUMENTS

| | | | | |
|---|---|---|---|---|
| 2009/0208043 | A1 | 8/2009 | Woods | |
| 2011/0028191 | A1* | 2/2011 | Huang | H04M 1/03 455/575.7 |
| 2014/0010394 | A1 | 1/2014 | Kvist | |
| 2015/0036854 | A1* | 2/2015 | Polinske | H01Q 1/273 381/315 |
| 2018/0139548 | A1* | 5/2018 | Kuhn | H01Q 7/00 |
| 2019/0349694 | A1* | 11/2019 | Farmakidis | H04R 25/65 |

FOREIGN PATENT DOCUMENTS

| | | |
|---|---|---|
| EP | 3185583 | 6/2017 |
| WO | 2015127972 | 9/2015 |

* cited by examiner

INTEGRATED MICROPHONE AND ANTENNA APPARATUS AND METHOD OF OPERATION

CROSS-REFERENCE TO RELATED PATENT APPLICATION

This application claims the benefit of U.S. Provisional Patent Application No. 62/680,546, filed Jun. 4, 2018, the disclosure of which is incorporated herein by reference in its entirety.

BACKGROUND

Microphones and antennas are often deployed in devices that send and receive audio signals. Microphones are generally positioned away from antennas and other sources of electromagnetic radiation because proximity to sources of electromagnetic radiation can reduce the efficiency of the antenna, and proximity to the antenna can corrupt the audio signals generated by the microphone. As devices that send and receive audio signals, such as phones, smart watches, headphones, and other space-constrained internet-of-things (IoT) devices become smaller in size, it would be beneficial to develop a microphone and an antenna that can be positioned close together without a loss of efficiency of the antenna and/or a corruption of audio signals generated by the microphone.

Figure 1:
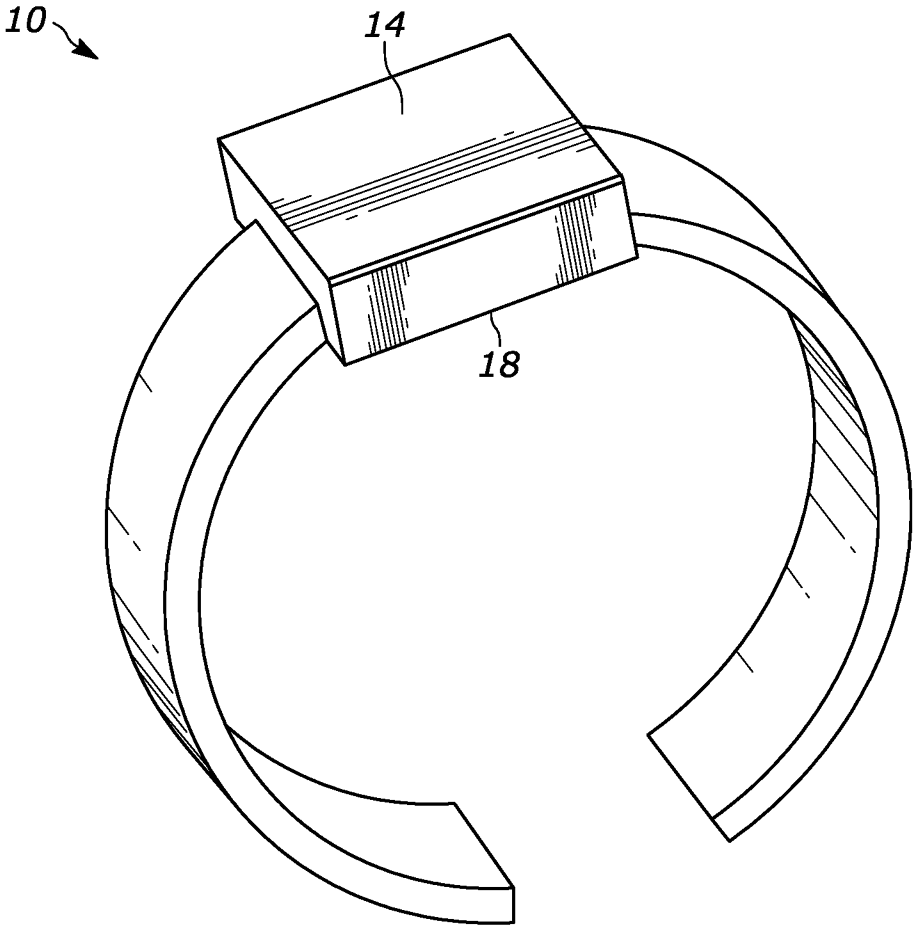
FIG. 1 is a perspective view of a smart watch for use with an integrated microelectromechanical systems (MEMS) microphone and antenna according to some implementations of the present disclosure.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other drawings may be made, without departing from the spirit or scope of the subject matter presented here. It will be readily understood that aspects of the present disclosure, as generally described herein, and illustrated in the figures can be arranged, substituted, combined, and designed in a wide variety of different configurations, all of which are explicitly contemplated and make part of this disclosure.

DETAILED DESCRIPTION

FIG. 1 illustrates a device 10 that can send and receive acoustic signals. The device 10 of FIG. 1 is a smart watch, but in other implementations, the device 10 can be any other device capable of sending and receiving acoustic signals, such as a smart phone, headphones, headsets, and tablet computing devices. As illustrated in FIG. 1, the device 10 includes a screen 14 and a housing 18 for electronic components of the device 10, such as a microphone, an antenna, a computing device including a processor and a memory, and a battery.

Figure 2:
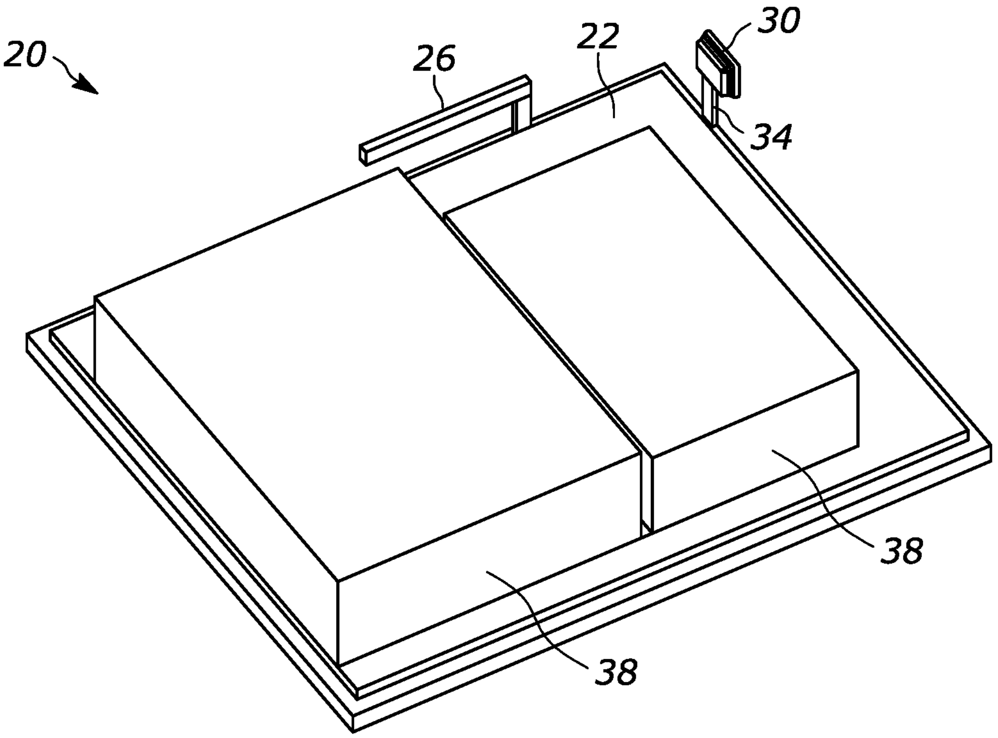
(PRIOR ART) Figure 2
FIG. 2 is a perspective view of a prior art arrangement of a MEMS microphone and an antenna secured to a substrate.

FIG. 2 illustrates a prior art internal configuration 20 of a device, such as the device 10, that can send and receive acoustic signals. The internal configuration 20 includes a device substrate 22 (e.g., circuit board), a prior art antenna 26, and a prior art MEMS microphone 30. The antenna 26 and the MEMS microphone 30 are separate components. The antenna 26 is secured to the device substrate 22 and is positioned generally above the device substrate 22. As shown in FIG. 2, the MEMS microphone 30 can be connected to the device substrate 22 by a mount 34. The antenna 26 is spaced from the MEMS microphone 30 on the device substrate 22 to increase efficiency of the antenna 26 by reducing interference between the microphone signals and the antenna signals. Other components of the internal configuration 20 are indicated generally on the device substrate 22 by the blocks 38.

Figure 3:
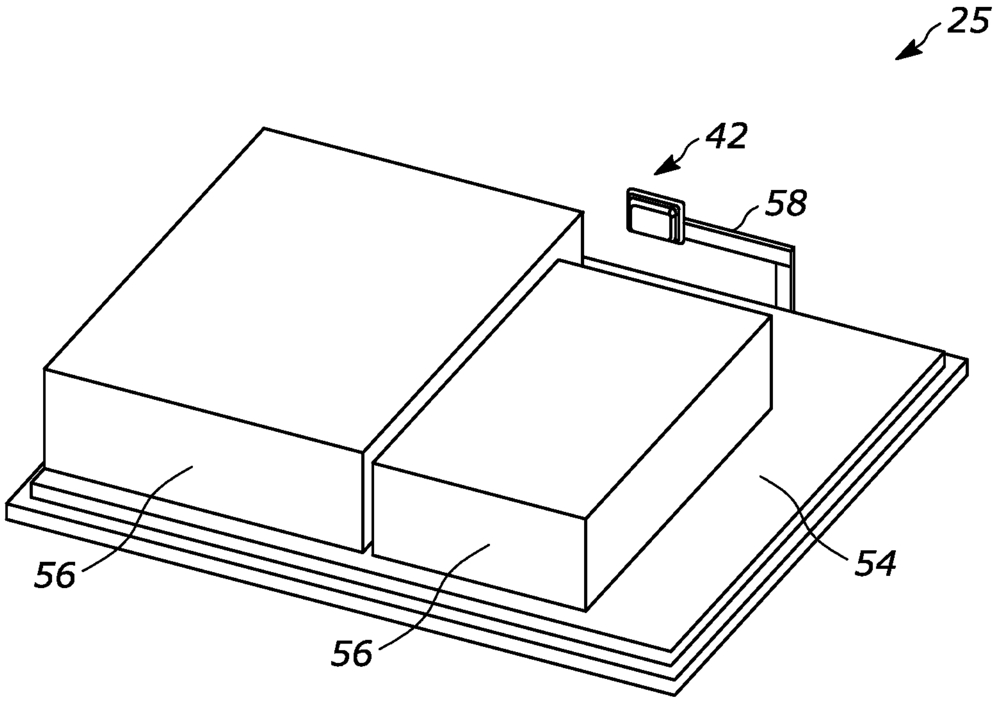
FIG. 3 is a perspective view of an integrated MEMS microphone and antenna secured to a substrate according to some implementations of the present disclosure.

FIG. 3 illustrates an internal configuration 25 of a device, such as the device 10, that can send and receive acoustic signals and includes an integrated MEMS microphone and antenna 42 according to the present disclosure. The integrated MEMS microphone and antenna 42 includes a MEMS microphone and an antenna. In the illustrated implementation, the integrated MEMS microphone and antenna 42 is connected to a device substrate 54 (e.g., circuit board) by a flexible mount 58. In some implementations, the mount can be a flex printed circuit board (PCB). The flex PCB can be made of a polyimide material such as Kapton ®. In other implementations, the integrated MEMS microphone and antenna 42 can be secured to the device substrate 54 by a rigid mount or mounted directly on the device substrate 54. The antenna 50 is formed by at least a portion of a housing of the MEMS microphone as is described in more detail below. In some implementations, the antenna 50 is tuned to respond to WiFi 5G signals. Other components of the internal configuration 25 are indicated generally on the device substrate 54 by the blocks 56.

As can be seen by comparison of FIG. 3 with FIG. 2, the integrated MEMS microphone and antenna 42 saves space on the device substrate 54 by allowing the MEMS microphone and the antenna 50 to be positioned in close proximity to each other without degradation of the acoustic signal of the microphone or a reduction in transmission efficiency of the antenna 50. Accordingly, the integrated MEMS microphone and antenna 42 is well-suited for use on small electronic devices that can send and receive acoustic signals. For example, the integrated MEMS microphone and antenna 42 can be used in smart phones, smart watches, headphones, headsets, tablet computing devices, and other space-constrained Internet-of-Things (IoT) devices.

Figure 4:
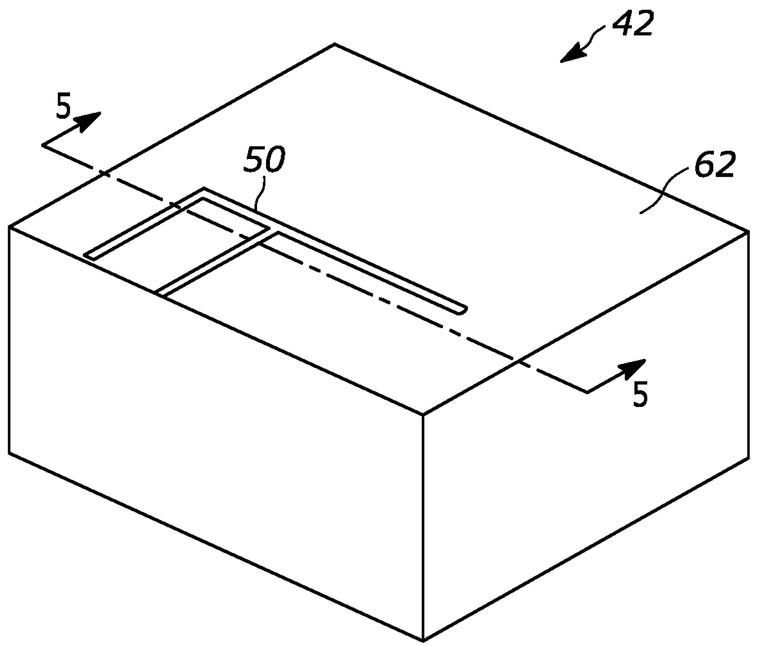
FIG. 4 is a perspective view of the MEMS microphone and antenna according to some implementations of the present disclosure.

FIG. 4 illustrates a perspective view of the integrated MEMS microphone and antenna 42. The integrated MEMS microphone and antenna 42 includes a housing 62 and antenna 50 traces.

Figure 5:
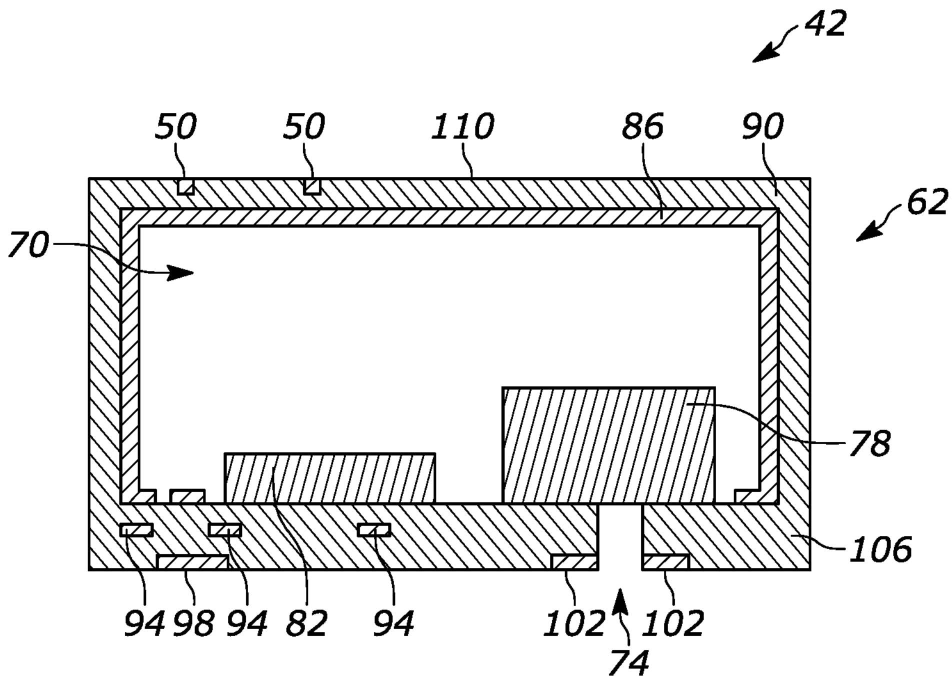
FIG. 5 is a section view of the MEMS microphone and antenna of FIG. 4 taken along lines 5-5.

FIG. 5 illustrates a cross-sectional view of the MEMS microphone and antenna 50 taken along lines 5-5. The integrated MEMS microphone and antenna 42 includes the antenna 50 and a MEMS microphone. The MEMS microphone includes a MEMS transducer 78, an application specific integrated circuit (ASIC) 82, and a housing 62. The housing 62 defines a cavity 70 including a sound port 74. The ASIC 82 and the MEMS transducer 78 are positioned in the cavity 70. The MEMS transducer 78 is generally aligned with the sound port 74 such that changes in pressure are transmitted to the MEMS transducer 78. The MEMS transducer 78 generates an electrical signal indicative of a change in pressure and sends the electrical signal to the ASIC 82. The ASIC 82 generates an audio output based on the electrical signal generated by the MEMS transducer 78. For example, acoustic activity generates a change in capacitance across components of the MEMS transducer 78 (e.g., between a diaphragm and a backplate of the MEMS transducer 78), and an output signal from the MEMS transducer 78 is used by the ASIC 82 to generate an output indicative of the sensed acoustic activity.

The housing 62 includes a conductive layer 86 and an insulating layer 90. The conductive layer 86 is made of a conductive material, such as a metal material. At least a portion of the conductive layer 86 forms the main radiating element of the antenna 50. The insulating layer 90 is formed on at least a portion of an exterior surface of the conductive layer 86. The insulating layer 90 can be made from a dielectric material such as a FR-4 or bismaleimide-triazine (BT) composite material. The insulating layer 90 material can be used for microphone signal filtering or antenna matching through the use of resistive, capacitive, and/or inductive films, or discrete resistive, capacitive, and/or inductive elements embedded in the housing 62. In other implementations, the insulating layer 90 can be formed by other insulating materials, such as ceramic and/or other dielectric materials. An amount of material and/or a type of material forming the insulating layer 90 can be adjusted to tune the conductive layer (e.g., change a frequency of signals that the conductive layer 86 can send and/or receive by changing a resonant frequency of the conductive layer 86). In some implementations, the insulating layer 90 material can be FR-4, a ceramic, Teflon®, or polyimide (e.g., Kapton®). The insulating layer 90 can include leads and traces 94 forming an internal routing of signals to and from the ASIC 82 and the MEMS transducer 78. An output pad 98 and a microphone power (e.g., VDD) pad 102 are formed in a lower surface 106 of the insulating layer 90. Electrical connections to other electrical devices can be formed at the output pad 98 and/or the VDD pad 102. In some embodiments, radio frequency (RF) filtering circuitry may be positioned between the ASIC and the output pad 98. The antenna 50 traces are etched into the top surface 110 of the insulating layer 90.

The antenna 50 can be sized and/or shaped for a target frequency range of signal. For example, the small size of the housing 62 allows for the conductive layer 86 of the housing 62 to form the antenna 50 in implementations in which the antenna 50 is used for high frequency RF signals, such as WiFi signals and 5G cellular signals. In such an implementation, the antenna 50 can be a cellular antenna sized to respond to frequencies in the cellular (e.g, 2G, 3G, and/or 4G), frequency band ranging between 700 MHz-2700 MHz. More specifically, the antenna 50 can be sized to respond to frequencies of 700 MHz, 800 MHz, 1700-2100 MHz, 1900 MHz, and/or 2500-2700 MHz. In implementations in which the antenna 50 is a WiFi antenna, the antenna 50 can be sized to respond to frequencies in the WiFi frequency bands of 2.4 GHz, 3.6 GHz, 4.9 GHz, 5 GHz, and 5.9 GHz.

In some implementations, the antenna 50 can be a 5G cellular antenna sized to respond to frequencies in the 5G frequency band ranging between 1 GHz and 60 GHz. In implementations in which the 5G frequency is between 1 GHz and 6 GHz, the antenna 50 is formed from the conductive layer 86 of the housing 62. In implementations in which the 5G frequency is above 6 GHz, the antenna is formed on a portion of the insulating layer 90 of the housing 62 or etched into a portion of the insulating layer 90 of the housing 62.

In some implementations, the antenna 50 can be a Bluetooth antenna sized to respond to frequencies in the Bluetooth frequency band of approximately 2 GHz-2.5 GHz. For antennas 50 sized to sense lower frequency RF signals such as Bluetooth signals, the antenna 50 can include a portion formed from the conductive layer 86 of the housing 62 and a portion that extends onto at least a portion of the flexible mount 58.

Figure 6:
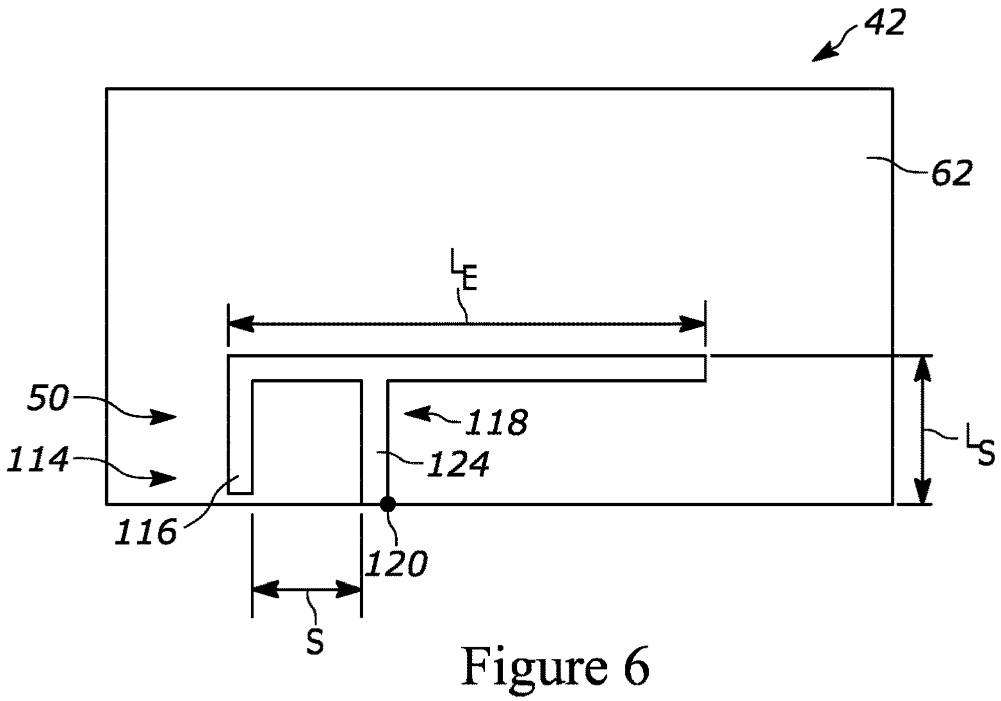
FIG. 6 is a top view of the MEMS microphone and antenna of FIG. 4.

FIG. 6 illustrates a top view of the integrated MEMS microphone and antenna 42. In the implementation illustrated in FIG. 6, the antenna 50 can be formed on the housing 62. At least a portion of the antenna 50 is connected to the conductive layer 86 material. In other implementations, the antenna 50 can be etched into the insulating layer 90 of the housing 62. In implementations in which the antenna 50 is etched into the insulating layer 90, portions of the insulating layer 90 are removed on the insulating layer 90 of the housing to expose a portion of the conductive layer 86 of the housing 62. The exposed portions of the conductive layer 86 then form the antenna 50.

The antenna 50 illustrated in FIG. 6 is an inverted-F antenna. The antenna 50 includes a grounded portion 114 and an antenna feed or a signal transmission portion 118. The grounded portion 114 is connected to a ground layer of the microphone by a via connection (not shown). More specifically, a distal end 116 of the grounded portion 114 may be connected to the ground line (not shown). The signal transmission portion 118 is in electric communication with the conductive layer 86. The signal transmission portion 118 is connected to a transmission line 120 on a side wall of the microphone. The transmission line may be on an outside of the housing 62 or embedded into the insulating layer 92 of the housing 62. More specifically, a distal end 124 of the signal transmission portion 118 may be connected to the transmission line 120. In other implementations, the antenna 50 can be an inverted-L monopole antenna, a (planar) inverted-F antenna (IFA/PIFA), a slot antenna, and other shapes of antenna. The antenna 50 can be sized and/or shaped for a target frequency range of signal. In the illustrated implementation, the antenna 50 is a monopole antenna and is sized such that electrical length $L_E$ of the antenna is a quarter wavelength of the signal. Shunt inductive matching can be used to vary an electrical length of the antenna 50 to further tune the antenna 50 to the target signal range. In the illustrated embodiment, the length $L_E$ is approximately 0.825 mm. In the illustrated implementation, the length $L_S$ of the signal transmission portion is approximately 0.2 mm. In the illustrated implementation, a spacing S between the grounded portion 114 and the signal transmission portion 118 is approximately 0.2 mm. The spacing S between the grounded portion 114 and the signal transmission portion 118 is based on the impedance of the signal transmission portion. The impedance of the signal transmission portion is determined based on an impendence of the antenna 50, which can vary based on the target frequency range of the signal.

For example, in the implementation illustrated in FIG. 6, the antenna 50 is sized for a signal having a frequency of approximately 25 GHz. A wavelength of the signal is 12 mm in the air. Accordingly, a quarter wavelength of the signal is 3 mm in the air and 1.65 mm in the FR-4 or BT material used in the insulating layer. Accordingly, the electronic length $L_E$ of the antenna 50 is 1.65 mm because the vibrations of the antenna occur in the insulating layer 90 because the antenna 50 in the exemplary embodiment is etched into the insulating layer 90. A length $L_S$ of the signal transmission portion 118 is approximately 0.4 mm. In another implementation, the antenna 50 can be sized for a signal having a frequency of approximately 20 GHz. A wavelength of this signal is 15 mm, with a quarter wavelength of 3.75 mm in air and 1.8 mm in FR-4. In such an implementation, the length $L_E$ can be 1.7 mm and the length $L_s$ can range between approximately 0.2 mm-1 mm.

Figure 7:
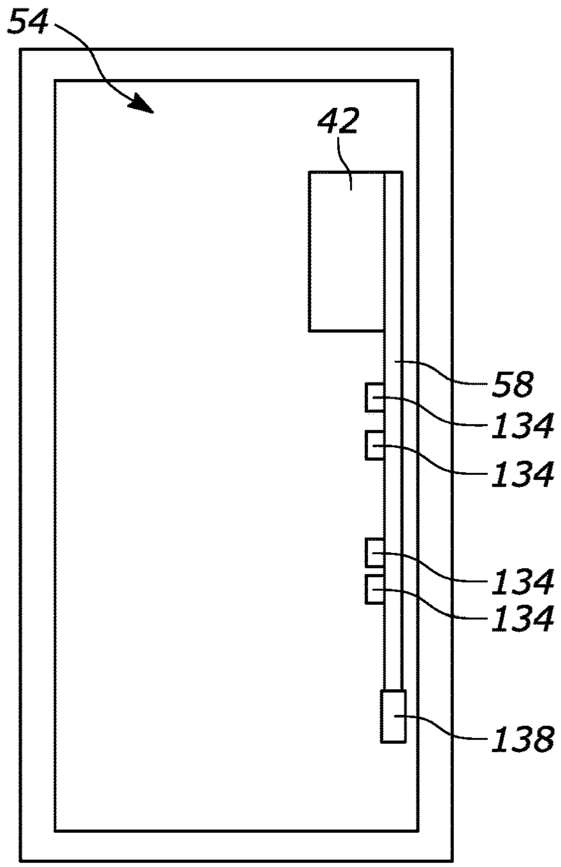
FIG. 7 is a top view of a circuit board including the MEMS microphone and antenna according to some implementations of the present disclosure.

FIG. 7 illustrates a top view of the integrated MEMS microphone and antenna 42 mounted to the device substrate 54 by the flexible mount 58. The flexible mount 58 is mounted to the device substrate 54 by a connector 138. The flexible mount 58 includes communication lines for sending and receiving signals between the components of the integrated MEMS microphone and antenna 42 and other electronic components secured to the device substrate 54. In the illustrated implementation, the device substrate 54 can include other electronic components for signal processing and/or other functionalities of the equipment in which the integrated MEMS microphone and antenna 42 is deployed. The flexible mount 58 is electrically coupled to the ASIC 82 in communication with the MEMS transducer 78 of FIG. 5 to facilitate electrical communication between the ASIC 82 and other electronic components coupled to the device substrate 54. The flexible mount can include low pass filters 134 that prevent antenna signals from being transmitted on lines connected to the microphone as described in greater detail below.

Figure 8:
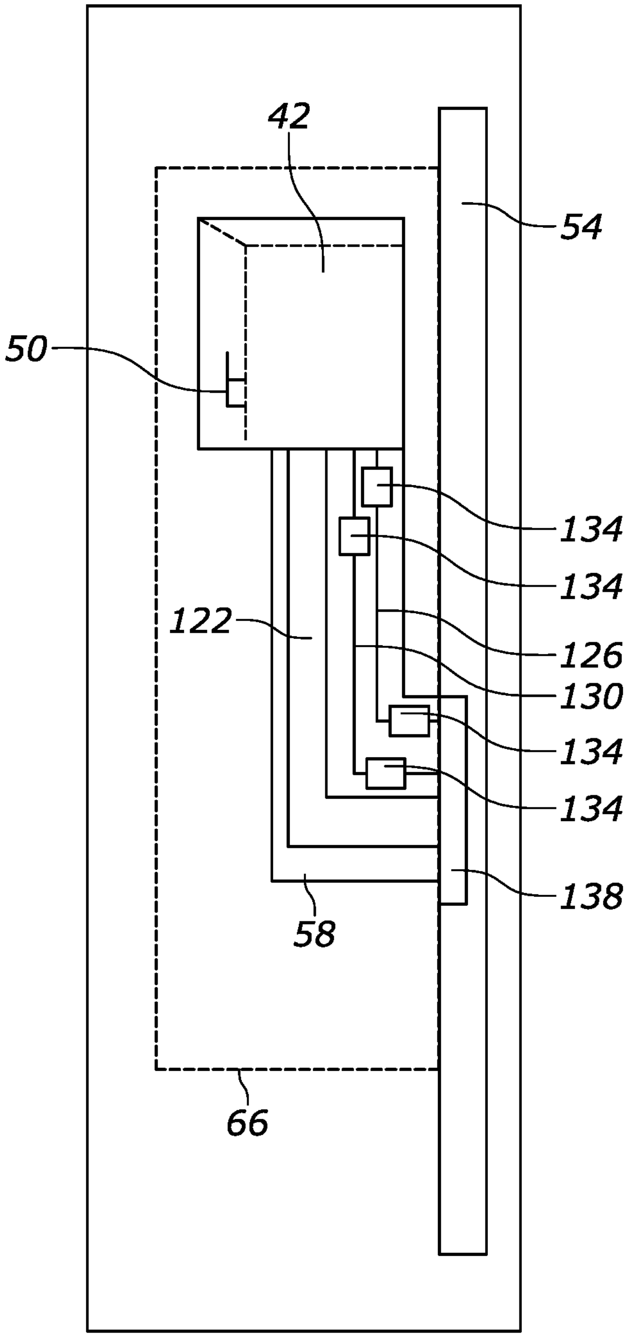
FIG. 8 is a side view of a circuit board including the MEMS microphone and antenna according to some implementations of the present disclosure.

FIG. 8 illustrates a side view of the integrated MEMS microphone and antenna 42 engaged with the device substrate 54. The integrated MEMS microphone and antenna 42 is positioned above the device substrate 54 by the flexible mount 58. The flexible mount 58 includes a combined antenna and ASIC ground line 122, a microphone power (e.g., VDD) line 126, and an acoustic signal line 130. The combined antenna and ASIC ground line 122 forms a portion of the antenna 50 of the integrated MEMS microphone and antenna 42. Both the microphone power line 126 and the acoustic signal line 130 include at least one low pass filter 134 for preventing antenna signals from being transmitted on the microphone power line 126 and the acoustic signal line 130. As can be seen in FIG. 8, the insulator 66 surrounds the integrated MEMS microphone and antenna 42 and the flexible mount 58. In the illustrated implementation, the insulator 66 is a non-metallized portion of the device substrate 54. The insulator 66 improves an efficiency of the radiating component of the antenna 50 by reducing an amount of metal proximate the antenna 50. The insulator 66 can also prevent the electromagnetic waves sent and received by the antenna 50 from interfering with other elements on the device substrate 54.

Figure 9:
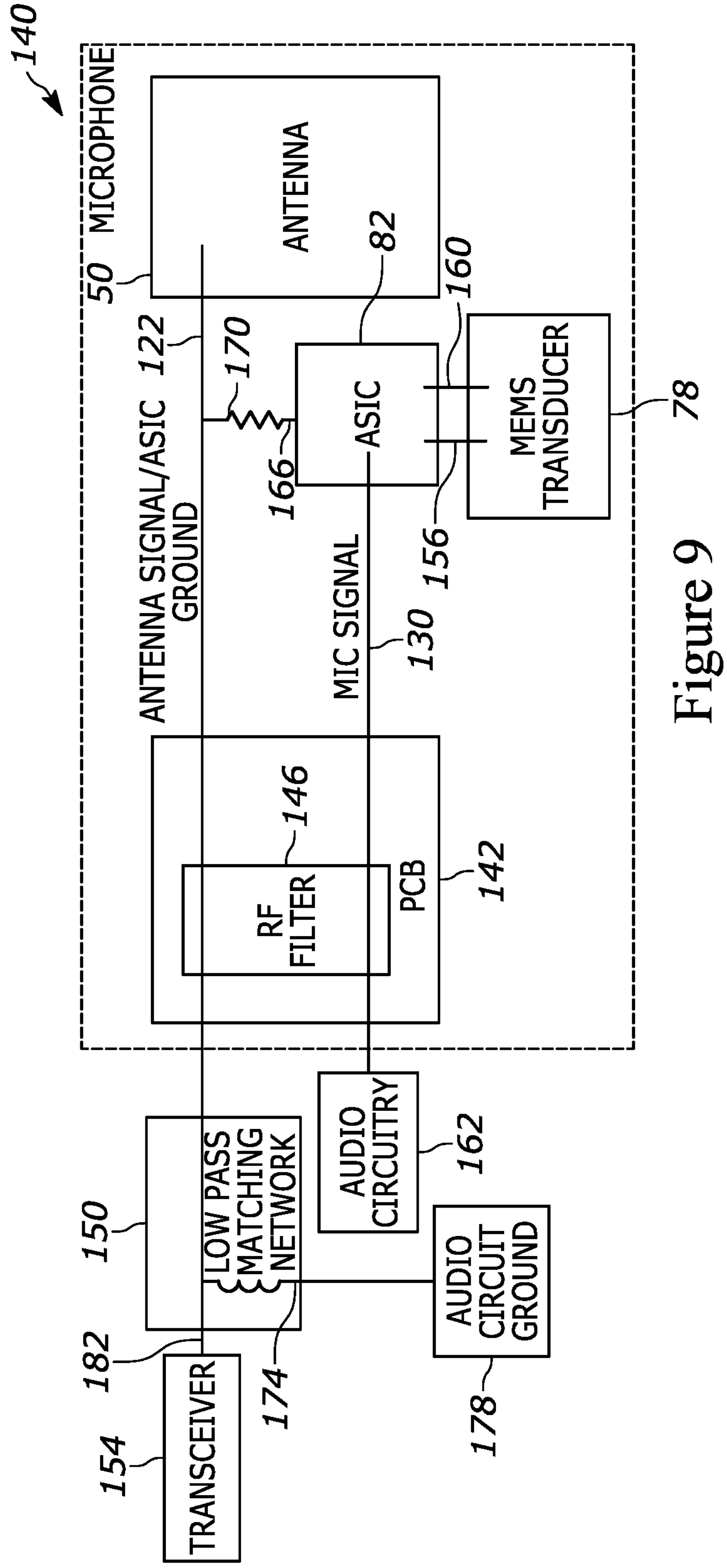
FIG. 9 is a schematic representation of a control system of the integrated MEMS microphone and antenna according to some implementations of the present disclosure.

FIG. 9 illustrates a schematic representation of a printed circuit board (PCB) 140 for the integrated MEMS microphone and antenna 42. The MEMS microphone includes the antenna 50, the MEMS transducer 78, the ASIC 82, and the PCB 142. The PCB 142 includes a filter 146. The filter 146 is a low pass filter that is configured to pass signals in an audible frequency range, which ranges between 20 Hz-20 kHz. In some embodiments, the filter 146 can pass signals in an ultrasonic frequency range that ranges between 20 KHz and 100 KHz. The filter 146 is configured to remove high frequency signals, such as the signals in the frequency ranges described with respect to the frequency range of the antenna 50. In the illustrated implementation, the filter 146 is positioned on the PCB 142 that is positioned within the MEMS microphone. In other implementations, the filter 146 can be positioned on the device substrate 54. The PCB can be structured for dielectric loading of the antenna 50, and/or can be structured for antenna matching. For example, in some implementations, the dielectric loading of the antenna 50 can be increased by increasing an amount of non-metallized PCB material proximate the antenna 50, which can reduce a resonant frequency of the antenna 50 so that the antenna 50 can send and receive longer wavelengths. In some implementations, capacitive, resistive, and/or inductive elements can be embedded in the PCB 142 for antenna matching.

As illustrated in FIG. 9, the antenna 50 is connected to the combined antenna and ASIC ground line 122, which is connected to an impedance matching network 150 and a radio frequency transceiver 154. The impedance matching network 150 is a low pass impedance matching network that is structured to filter current sent by the ASIC 82 from the antenna signal. The antenna signal is then sent to the radio frequency transceiver 154. The ASIC 82 is connected to the MEMS transducer 78 and generates an audio signal based on the signal transmitted by the MEMS transducer 78. The MEMS transducer 78 is connected to the ASIC 82 by a second acoustic signal line 156 and a MEMS ground line 160. The ASIC 82 is connected to the acoustic signal line 130 and the combined antenna signal and ASIC ground line 122. The acoustic signal line 130 is connected to the filter 146 and to the audio processing circuitry 162 positioned on the device substrate 54 via the flexible mount 58. An ASIC ground line 166 is connected to the combined antenna signal and ASIC ground line 122. In some implementations, an optional filter 170 is positioned between the ASIC ground line 166 and the combined antenna signal and ASIC ground line 122. The optional filter 170 is a low pass filter configured to allow the low frequency signals sent along the ASIC ground line 166 to pass to the combined antenna signal and ASIC ground line 122 and to prevent the high frequency signals sent by the MEMS microphone along the combined antenna signal and ASIC ground line 122 from reaching the ASIC 82. The impedance matching network 150 is structured to match an impedance of the antenna 50 and an impedance of the radio frequency transceiver 154. The impedance matching network 150 is a low pass impedance matching network that includes a shunt inductor 174. An impedance of the shunt inductor 174 increases with increasing frequency. Accordingly, the impedance of the shunt inductor 174 is low for the low frequency ASIC ground signal. The low frequency ASIC ground signal therefore crosses the shunt inductor 174 and travels to an audio ground line 178. In contrast, the impedance across the shunt inductor 174 is high for the high frequency antenna signal. Accordingly, the antenna signal does not cross the shunt inductor 174 and instead travels along an antenna signal line 182 to the radio frequency transceiver 154. The radio frequency transceiver 154 is configured to receive incoming signals from the antenna 50 and to provide outgoing signals to the antenna 50 for transmission. As shown in FIG. 9, the ASIC ground line 166 is connected to the combined antenna signal and ASIC ground line 122. Accordingly, in the illustrated implementation, RF demodulation is provided by the shunt inductor 174.

Figure 10:
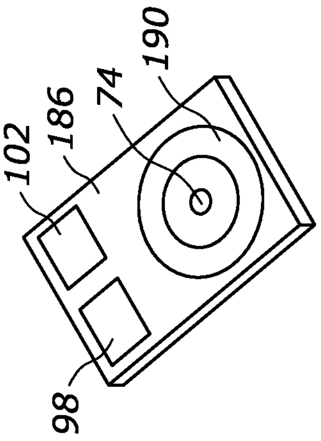
FIG. 10 is a perspective view of a microphone package substrate of an integrated MEMS microphone and antenna including the control system of FIG. 9 according to some implementations of the present disclosure.

FIG. 10 illustrates a microphone package substrate 186 of the integrated MEMS microphone and antenna 42. The microphone package substrate 186 can be formed on a bottom surface of the housing 62. The microphone package substrate 186 includes the sound port 74, a combined antenna and microphone ground pad 190, the output pad 98, and the VDD pad 102. The MEMS transducer 78 is generally aligned with the sound port 74 such that the changes in pressure are transmitted to the MEMS transducer 78. The combined antenna and microphone ground pad 190, the output pad 98, and the VDD pad 102 are connected to components of the PCB 142 and can be connected to other electronic components such that the other electronic components can send and/or receive signals to and/or from the components of the PCB 142. The combined antenna and microphone ground pad 190 is coupled to the antenna 50 through the combined antenna and ASIC ground line 122 of the ASIC 82. Accordingly, in the illustrated implementation, RF demodulation is provided by the shunt inductor 174. The combined antenna and microphone ground pad 190 is coupled to the radio frequency transceiver 154 through the impedance matching network 150. The combined antenna and microphone ground pad 190 is coupled to a ground line on the device substrate 54 by the flexible mount 58 to ground the ASIC 82. The combined antenna and microphone ground pad 190 allows the microphone package substrate 186 to have the pad configuration of a traditional microphone without the need for a separate antenna pad. The output pad 98 is connected to an output of the ASIC 82. The output pad 98 is connected to audio processing circuitry 162 on the device substrate 54 by the flexible mount 58. The VDD pad 102 is connected a power supply (not shown) through the flexible mount 58 to provide power to the MEMS transducer 78 and the ASIC 82.

Although FIGS. 9 and 10 are described with respect to the integrated MEMS microphone and antenna 42, in other implementations, the integrated microphone and antenna can include other types of microphones, such as piezoelectric microphones. In some implementations, the methods described in the present disclosure could be used to integrate an antenna with other types of pressure sensors (e.g., non-microphone pressure sensors).

Figure 11:
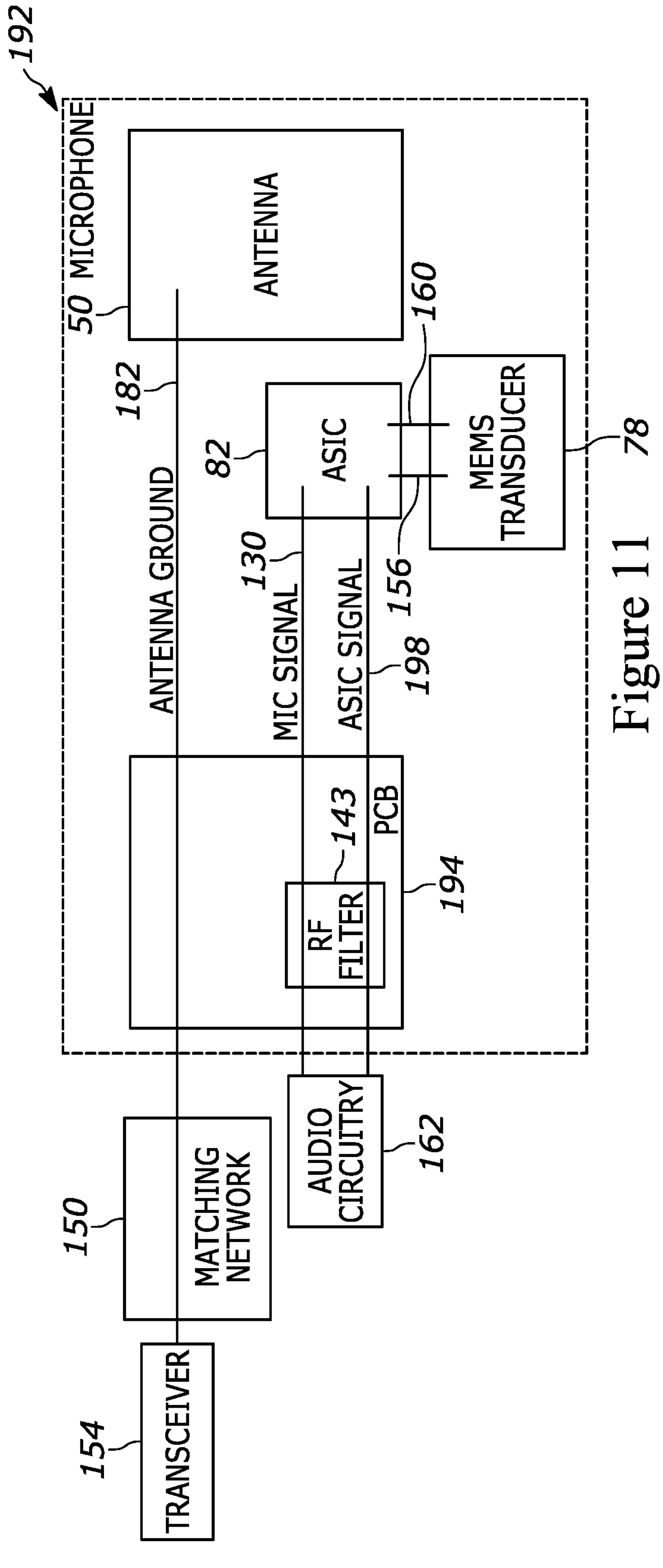
FIG. 11 is a schematic representation of a control system of the integrated MEMS microphone and antenna according to some implementations of the present disclosure.

FIG. 11 illustrates a schematic representation of a signal processing circuit board (PCB) 192 for the integrated MEMS microphone and antenna 42 according to some implementations. The integrated MEMS microphone and antenna 42 includes the antenna 50, the MEMS transducer 78, the ASIC 82, and the PCB 194. The PCB 194 includes the filter 143, such as the filter 146, can be structured for dielectric loading of the antenna 50, and/or can be structured for antenna matching as described above with respect to FIG. 9. As illustrated in FIG. 11, the antenna 50 is connected to an antenna signal line 182, which is connected to the impedance matching network 150 and the radio frequency transceiver 154. The impedance matching network 150 is structured to match an impedance of the antenna 50 and an impedance of the radio frequency transceiver 154. The radio frequency transceiver 154 is configured to receive incoming signals from the antenna 50 and to provide outgoing signals to the antenna 50 for transmission. The ASIC 82 is connected to the MEMS transducer 78 by the second acoustic signal line 156 and a MEMS ground line 160. The ASIC 82 generates an audio signal based on the signal generated by the MEMS transducer 78. The ASIC 82 is connected to an acoustic signal line 130 and an ASIC ground line 198. The acoustic signal line 130 is connected to the filter 143 and then to audio processing circuitry 162 (e.g., audio processing circuitry of the device within which the microphone device is integrated, such as a smartphone, computing device, etc.). The ASIC ground line 198 is connected to the filter 143 and to a ground line on the device substrate 54. The filter 143 is a low pass filter that is configured to pass signals in an audible frequency range, which ranges between 20 Hz-20 kHz. The filter 143 is configured to remove high frequency signals, such as the signals in the frequency ranges described with respect to the frequency range of the antenna 50. Accordingly, the filter 143 prevents signals sent or received by the antenna 50 from reaching the ASIC 82 and corrupting the microphone signals. In the illustrated implementation, the filter 143 is positioned on the PCB 194 positioned within the MEMS microphone. As shown in FIG. 11, the antenna signal line 182 is separate from the ASIC ground line 198. Such an implementation provides hard-wired RF demodulation because the acoustic signal line 130 and the ASIC ground line 198 are separate from the antenna signal line 182. In some implementations, the PCB 194 can be used in environments having large amounts of RF signals. For example, the PCB 194 can be used in a mobile device such as a cell phone or a tablet that has a Global System for Mobile Communications (GSM) transmitter. In some implementations, the integrated microphone and antenna 50 including the PCB 194 can be positioned close to the GSM transmitter.

Figure 12:
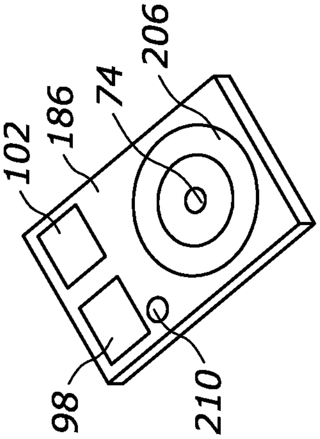
FIG. 12 is a perspective view of a microphone package substrate of an integrated MEMS microphone and antenna including the control system of FIG. 11 according to some implementations of the present disclosure.

FIG. 12 illustrates a microphone package substrate 202 of the integrated MEMS microphone and antenna 42 according to some implementations. The microphone package substrate 202 can be formed on a bottom surface of the housing 62. The MEMS transducer 78 is generally aligned with the sound port 74 such that the changes in pressure are transmitted to the MEMS transducer 78. The microphone package substrate 202 includes the sound port 74, an antenna pad 210, a microphone ground pad 206, the output pad 98, and the VDD pad 102. The antenna pad 210, the microphone ground pad 206, the output pad 98, and the VDD pad 102 are connected to components of the PCB 194 and can be connected to other electronic components such that the other electronic components can send and/or receive signals to and/or from the components of the PCB 194. The antenna pad 210 is coupled to the antenna 50 and is coupled to the radio frequency transceiver 154 through the impedance matching network 150. The microphone ground pad 206 is connected to the ASIC 82. The microphone ground pad 206 is coupled to a ground line on the device substrate 54 by a flexible mount (not shown) to ground the ASIC 82. The antenna pad 210 is separate from the microphone ground pad 206 to provide hardwired RF demodulation because the acoustic signal line 130 and the ASIC ground line 198 are separate from the antenna signal line 182. The output pad 98 is connected to an output of the ASIC 82. The output pad 98 is connected to audio processing circuitry 162 on the device substrate 54 by the flexible mount. The VDD pad 102 is connected a power supply (not shown) through the flexible mount to provide power to the MEMS microphone.

Although FIGS. 11 and 12 are described with respect to the integrated MEMS microphone and antenna 42, in other implementations, the integrated microphone and antenna can include other types of microphones, such as piezoelectric microphones. In some implementations, the methods described in the present disclosure could be used to integrate an antenna with other types of pressure sensors (e.g., non-microphone pressure sensors).

Figure 13:
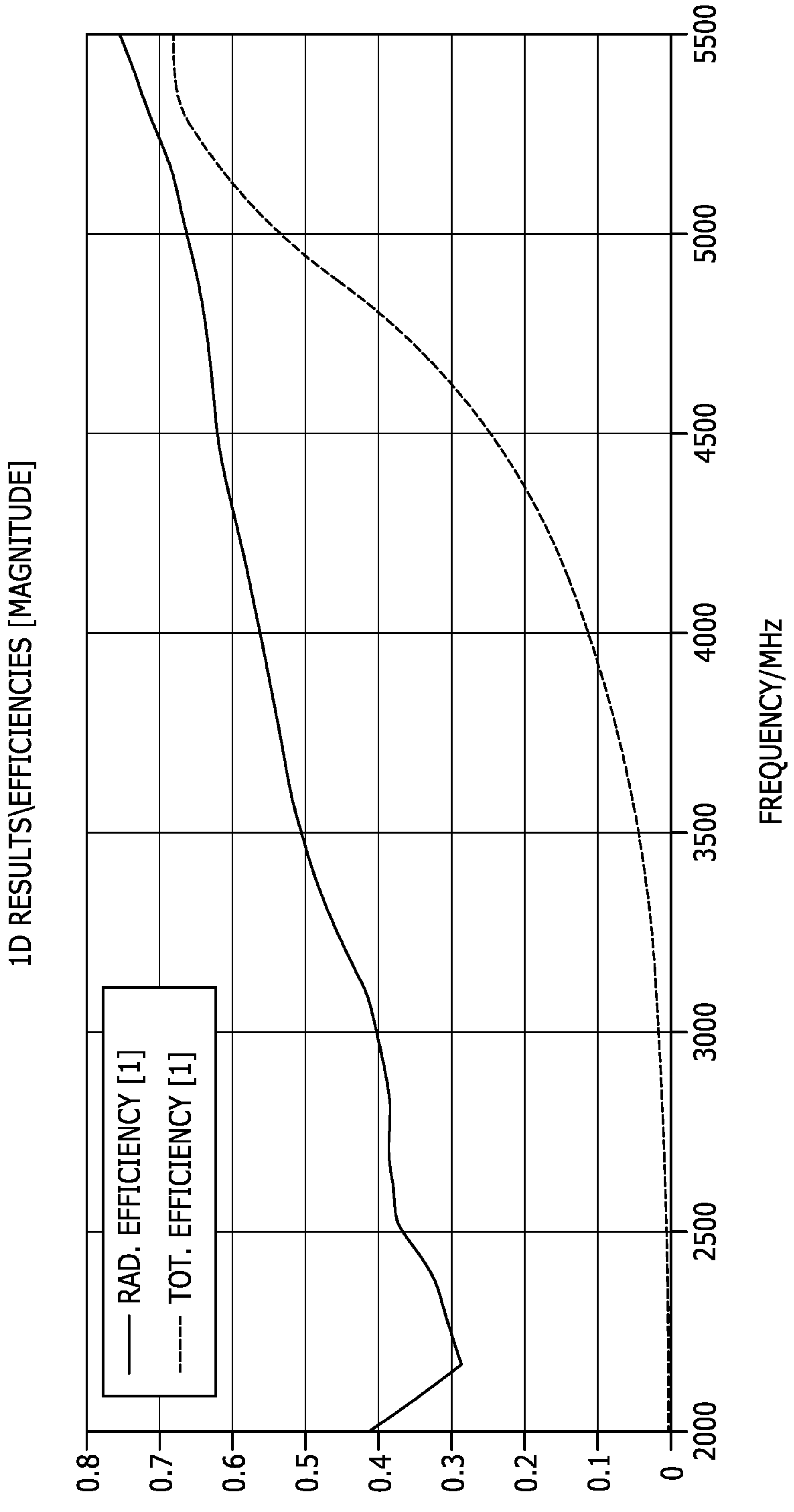
FIG. 13 illustrates a simulated transmission efficiency for the antenna in the prior art arrangement of FIG. 2.
Figure 14:
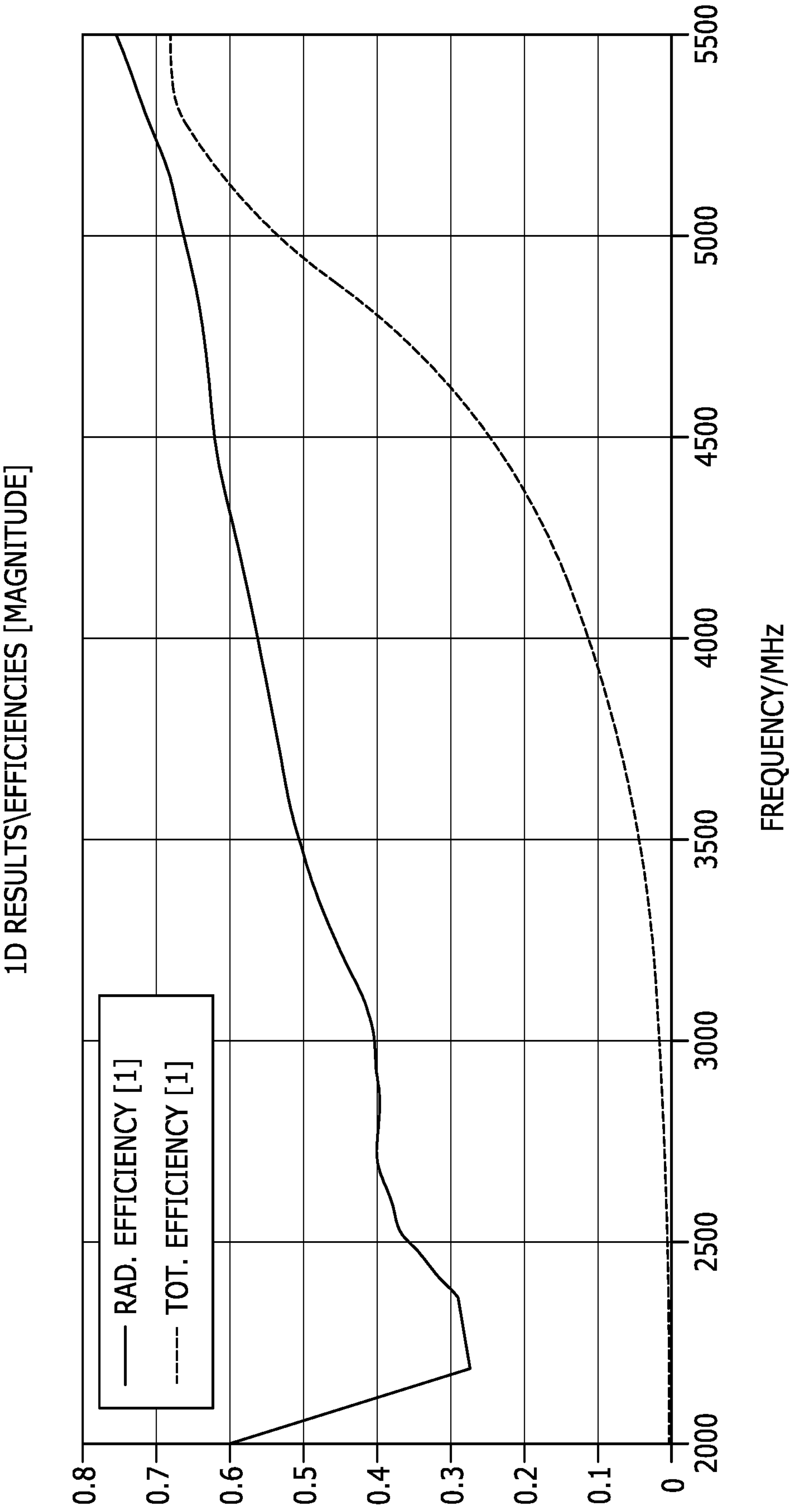
FIG. 14 illustrates a simulated transmission efficiency for the antenna in the integrated MEMS microphone and antenna of FIG. 3.

FIGS. 13 and 14 illustrate simulation results comparing the transmission efficiencies for the prior art antenna 26 illustrated in FIG. 2 and the integrated MEMS microphone and antenna 42 illustrated in FIG. 3, respectively.

FIG. 13 illustrates simulation results for the prior art antenna 26 over a frequency range of 2000 MHz-5500 MHz. The Y-axis of FIG. 13 indicates a transmission efficiency of the antenna 26. The X-axis of FIG. 13 indicates the signal frequency applied the antenna 26. The solid line indicates the maximum transmission efficiency possible based on the design of the antenna 26 shown in FIG. 2. The dashed line indicates the actual efficiency achieved by the antenna 26 shown in FIG. 2. As indicated in FIG. 13, the maximum possible efficiency of the antenna 26 is approximately 67% and the actual efficiency of the antenna 26 is approximately 60%.

FIG. 14 illustrates simulation results for the antenna 50 of the integrated MEMS microphone and antenna 42 over a frequency range of 2000 MHz-5500 MHz. The Y-axis of FIG. 14 indicates a transmission efficiency of the antenna 50. The X-axis of FIG. 14 indicates the signal frequency applied the antenna 50. The solid line indicates the maximum transmission efficiency possible based on the design of the antenna 50 shown in FIG. 3. The dashed line indicates the actual efficiency achieved by the antenna 50 shown in FIG. 3. As indicated in FIG. 14, the maximum possible efficiency of the antenna 50 is approximately 67% and the actual efficiency of the antenna 50 is approximately 60%.

In sum, the simulation illustrated in FIG. 13 for the antenna 26 arranged in the conventional internal configuration 20 has maximum possible transmission efficiency of 67% and an actual transmission efficiency of approximately 60%. The simulation illustrated in FIG. 14 for the combined antenna 42 and the internal configuration 25 has a maximum possible efficiency of approximately 67% and an actual transmission efficiency of approximately 60%. Accordingly, forming the antenna 50 on the housing 62 or etching the antenna 50 into the insulating layer 90 of the housing 62, as shown in FIGS. 4-6 does not have an adverse impact on the transmission efficiency of the antenna 50.

Figure 15:
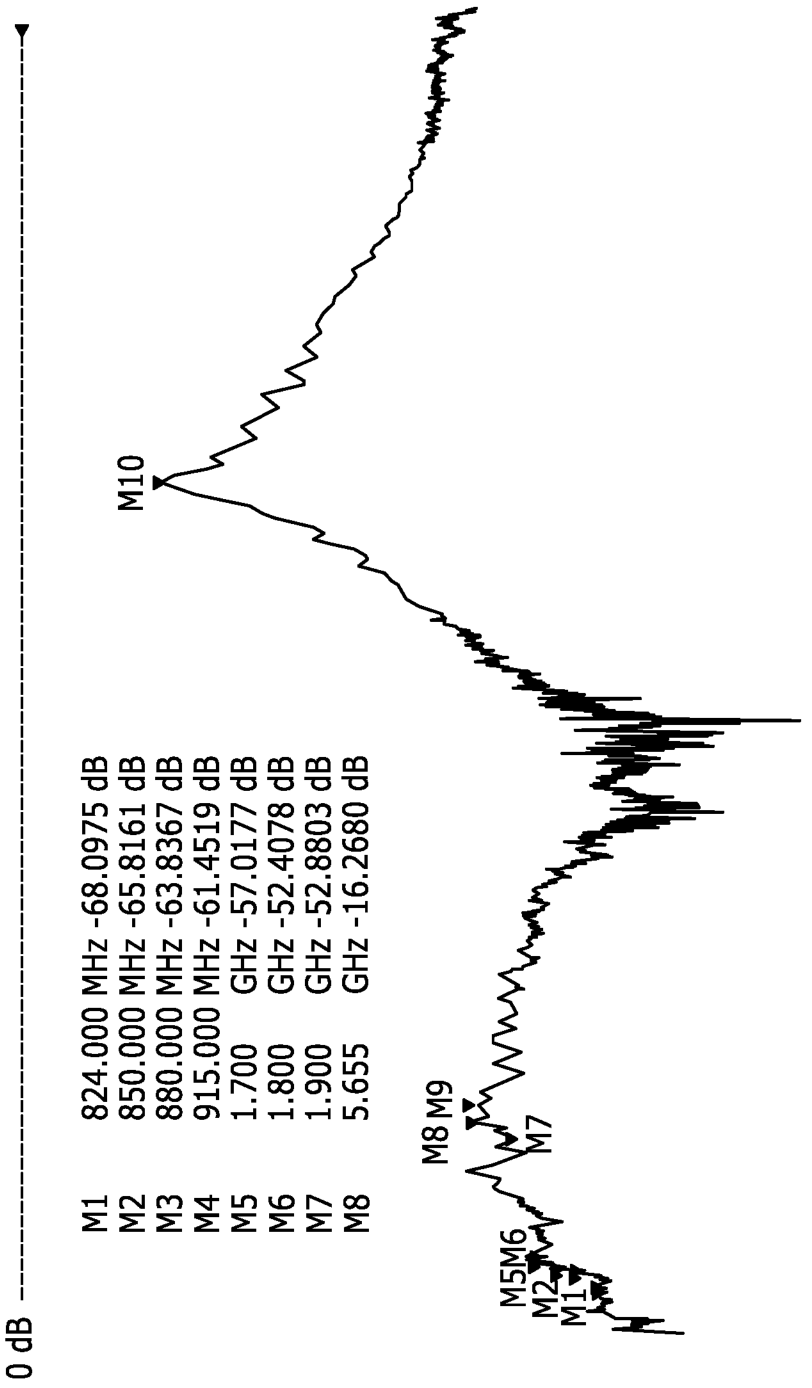
FIG. 15 illustrates the transmissions from the antenna of the integrated MEMS microphone and antenna of FIG. 3.

FIG. 15 illustrates transmission of the signal from the antenna 50 to a transceiver over a frequency range of 500 MHz-8.5 GHz that was generated using a simulation setup. As indicated in FIG. 15, the transmission peaks in the 5G range, indicating that the antenna 50 is sending adequate signal.

One implementation relates to an integrated microphone and antenna. The integrated microphone and antenna includes a microphone including a housing defining a cavity. The housing includes a conductive layer. The microphone further includes an acoustic transducer positioned within the cavity and structured to generate an acoustic signal. The integrated microphone and antenna further includes an antenna at least partially integrated with the microphone and structured to transmit and receive radio frequency signals. The antenna is structured to utilize the conductive layer of the housing as a radiating element.

Another implementation relates to an integrated microphone and antenna including a microphone structured to generate an acoustic signal. The integrated microphone and antenna further includes a housing at least partially enclosing the microphone. The housing is at least partially formed of a conductive material. The conductive material includes a radiating element of an antenna structured to transmit radio frequency signals. The integrated microphone and antenna further includes a first conductive path configured to communicate the radio frequency signals between an impedance matching network and the conductive material of the housing. The integrated microphone and antenna further includes a second conductive path configured to communicate acoustic signals between an external interface and a signal processing circuit configured to process the acoustic signal generated by an acoustic transducer. The second conductive path is electrically isolated from the first conductive path.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including by not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one recitation, even when the same claim includes the introductory phrases "one or more" or "at least one" and indefinite articles such as "a" or "an" (e.g. "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two functions," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g. "a system having at least one of A, B, or C: would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., means plus or minus ten percent.

The foregoing description of illustrative elements has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. An integrated microphone and antenna comprising:
a microphone comprising:
a housing defining a cavity, the housing comprising a conductive layer; and
an acoustic transducer positioned within the cavity and structured to generate an acoustic signal; and
an antenna at least partially integrated with the microphone and structured to transmit and receive radio frequency signals, the antenna structured to utilize the conductive layer of the housing as a radiating element.

2. The integrated microphone and antenna of claim 1, further comprising an insulating layer formed on at least a portion of an exterior surface of the housing, wherein the antenna is formed on or etched into at least an exterior of the insulating layer.

3. The integrated microphone and antenna of claim 1, further comprising an insulating layer extending over at least a portion of an exterior surface of the housing, the insulating layer lowering a resonant frequency of the antenna.

4. The integrated microphone and antenna of claim 1, further comprising a circuit board including
a first conductive path configured to transmit antenna signals between an impedance matching network and the conductive layer of the housing, and
a second conductive path different than the first conductive path and configured to transmit acoustic signals from a signal processing circuit to an external interface of the integrated microphone and antenna,
the second conductive path electrically isolated from the first conductive path and structured to block antenna signals.

5. The integrated microphone and antenna of claim 4,
wherein the first conductive path is configured to transmit a combined antenna and signal processing circuit ground signal,
the integrated microphone and antenna further comprising a filter coupled to the signal processing circuit and the first conductive path, the filter configured to filter out the antenna signal and provide the ground signal to the signal processing circuit.

6. The integrated microphone and antenna of claim 4, further comprising a third conductive path configured to transmit a signal processing ground signal to the signal processing circuit, the third conductive path electrically isolated from the first conductive path and the second conductive path.

7. The integrated microphone and antenna of claim 1, further comprising a mount structured to secure the integrated microphone and antenna to a substrate, and wherein at least a portion of the antenna is formed on the mount.

8. The integrated microphone and antenna of claim 1, wherein the integrated microphone and antenna is a microelectromechanical systems (MEMS) microphone.

9. The integrated microphone and antenna of claim 1, wherein the antenna is configured to communicate frequencies between approximately 700 MHz and approximately 2700 MHz.

10. The integrated microphone and antenna of claim 1, wherein the antenna is configured to communicate frequencies between approximately 1 GHz and approximately 60 GHz.

11. An integrated microphone and antenna comprising:
a microphone structured to generate an acoustic signal;
a housing at least partially enclosing the microphone, the housing at least partially formed of a conductive material, the conductive material comprising a radiating element of an antenna structured to transmit radio frequency signals;
a first conductive path configured to communicate the radio frequency signals between an impedance matching network and the conductive material of the housing;
a second conductive path configured to communicate acoustic signals between an external interface and a signal processing circuit configured to process the acoustic signal generated by an acoustic transducer, the second conductive path electrically isolated from the first conductive path.

12. The integrated microphone and antenna of claim 11, wherein the second conductive path includes a low pass filter structured to block the radio frequency signals.

13. The integrated microphone and antenna of claim 11, further comprising a third conductive path structured to transmit a ground reference to the signal processing circuit, the third conductive path including a low pass filter structured to block the radio frequency signals, the third conductive path electrically isolated from the first conductive path and the second conductive path.

14. The integrated microphone and antenna of claim 11, wherein the first conductive path comprises a combined conductive path configured to transmit both a ground signal and the radio frequency signals.

15. The integrated microphone and antenna of claim 14, further comprising a low pass filter positioned between the signal processing circuit and the combined conductive path configured to filter out the radio frequency signals and provide the ground signal to the signal processing circuit.

16. The integrated microphone and antenna of claim 14, wherein the combined conductive path further comprises a low pass impedance matching network including an inductor structured to couple a ground input to the low pass impedance matching network.

17. The integrated microphone and antenna of claim 11, wherein the signal processing circuit is an application specific integrated circuit.

18. The integrated microphone and antenna of claim 11, wherein the microphone is a microelectromechanical systems (MEMS) microphone and wherein the acoustic transducer is a MEMS transducer.

19. The integrated microphone and antenna of claim 11, wherein the antenna is configured to communicate frequencies between approximately 700 MHz and approximately 2700 MHz.

20. The integrated microphone and antenna of claim 11, wherein the antenna is configured to communicate frequencies between approximately 1 GHz and approximately 60 GHz.

* * * * *